(No Model.)
R. E. SWARTZ.
Plow-Share.
No. 228,138.
Patented May 25, 1880.
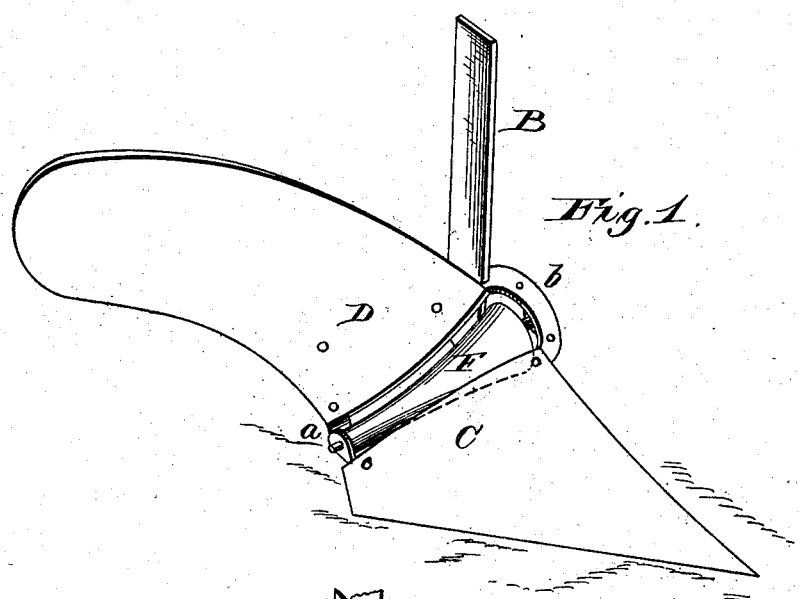
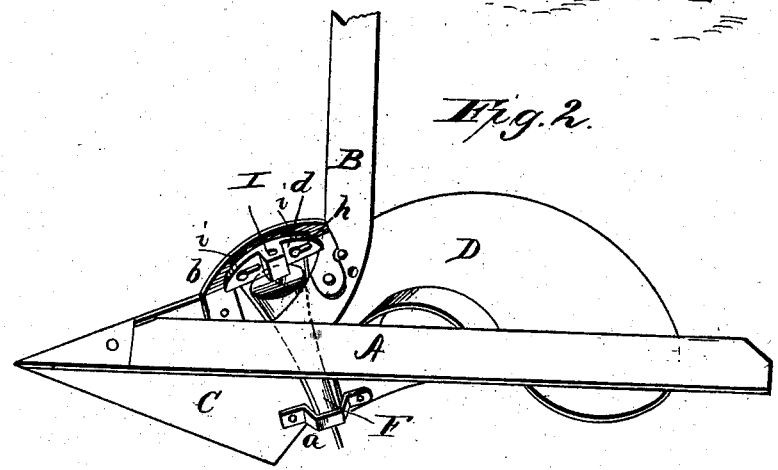
Witnesses:
Franck L. Ourand
H. Aubrey Toulmin
Inventor:
R. E. Swartz
By Alexander Mason
atty

United States Patent Office.

ROBERT E. SWARTZ, OF ROCK ISLAND, ILLINOIS.

PLOWSHARE.

SPECIFICATION forming part of Letters Patent No. 228,138, dated May 25, 1880.

Application filed April 5, 1880. (No model.)

*To all whom it may concern:*

Be it known that I, ROBERT E. SWARTZ, of Rock Island, in the State of Illinois, have invented certain new and useful Improvements in Plowshares; and I do hereby declare that the following is a full, clear, and exact description thereof, reference being had to the accompanying drawings, and to the letters of reference marked thereon, making a part of this specification.

The nature of my invention relates to plows having rollers arranged between the mold-board and the share; and it consists in a single adjustable roller interposed between the mold-board and share, and in the construction and arrangement of devices, as will be hereinafter more fully set forth, and pointed out in the claims.

In order to enable others skilled in the art to which my invention appertains to make and use the same, I will now proceed to describe its construction and operation, referring to the annexed drawings, in which—

Figure 1 is a perspective view embodying my invention. Fig. 2 is a side view thereof.

A represents the land-side, B the standard, C the share, and D the mold-board, of a plow constructed in any of the known and usual ways. The share C and mold-board D are separated, so as to leave an opening of any suitable size between them; but said parts are connected together by braces or straps $a$ and $b$, substantially as shown.

F represents a conical roller, made slightly concave, and having its journal at the smaller end placed in the connecting-brace $a$, while the journal at the larger end is placed in a box, I, attached to the under side of the connecting-brace $b$. This box is adjustable two ways—up and down and laterally.

The box I is provided with slotted ears $d\,d$, through which the fastening bolts or screws $h\,h$ are passed, said slots admitting of the box being moved forward or backward and fastened at any point. By the insertion of washers or plates $i$ between the box and the brace $b$ the box may be adjusted up or down, as required. The object of adjusting the box I is, of course, to adjust the roller for the purpose of causing a slight cross-friction, so that the edge of the sod will be more quickly elevated. This is accomplished by setting the roller at an angle to the motion of the sod from the point of the plow to the end of the mold-board, in the elevation and depression of the roller above or below the surface of the plow, and also in adjusting toward the front, so that the back side of the share shall act as a scraper on the roller to keep the surface of contact always clean.

Having thus fully described my invention, what I claim as new, and desire to secure by Letters Patent, is—

1. In a plow, a conical concave roller interposed between the share and mold-board and made adjustable at one or both ends, upward and downward as well as forward and backward, substantially for the purposes herein set forth.

2. The combination, in a plow, of the separated share C and mold-board D, the connecting-braces $a\,b$, roller F, and the adjustable box I, substantially as and for the purposes herein set forth.

In testimony that I claim the foregoing I have hereunto set my hand this 31st day of March, 1880.

ROBERT EMMETT SWARTZ.

Witnesses:
GEORGE W. REAUGH,
JOHN KOCH.